United States Patent
Saranrittichai et al.

(10) Patent No.: US 12,469,271 B2
(45) Date of Patent: Nov. 11, 2025

(54) TRAINING NEURAL NETWORKS WITH A LESSER REQUIREMENT FOR LABELLED TRAINING DATA

(71) Applicant: Robert Bosch GmbH, Stuttgart (DE)

(72) Inventors: Piyapat Saranrittichai, Nuremberg (DE); Andres Mauricio Munoz Delgado, Schoenaich (DE); Chaithanya Kumar Mummadi, Pittsburgh, PA (US); Claudia Blaiotta, Stuttgart (DE); Volker Fischer, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 348 days.

(21) Appl. No.: 18/309,335

(22) Filed: Apr. 28, 2023

(65) Prior Publication Data

US 2023/0360387 A1 Nov. 9, 2023

(30) Foreign Application Priority Data

May 6, 2022 (EP) .................................... 22172172

(51) Int. Cl.
  *G06V 10/82* (2022.01)
  *G06V 10/46* (2022.01)
  (Continued)

(52) U.S. Cl.
  CPC .............. *G06V 10/82* (2022.01); *G06V 10/46* (2022.01); *G06V 10/54* (2022.01); *G06V 10/56* (2022.01);
  (Continued)

(58) Field of Classification Search
  CPC ........ G06V 10/82; G06V 10/56; G06V 10/54; G06V 20/582; G06V 10/60; G06V 10/46; G06V 20/588; G06V 2201/07
  See application file for complete search history.

(56) References Cited

U.S. PATENT DOCUMENTS

2020/0104679 A1* 4/2020 van den Oord .......... G06N 3/08
2021/0375291 A1* 12/2021 Zeng ..................... H04L 67/306
(Continued)

OTHER PUBLICATIONS

Kendall, Alex, Yarin Gal, and Roberto Cipolla. "Multi-task learning using uncertainty to weigh losses for scene geometry and semantics." Proceedings of the IEEE conference on computer vision and pattern recognition. 2018. (Year: 2018).*

(Continued)

*Primary Examiner* — Utpal D Shah
(74) *Attorney, Agent, or Firm* — NORTON ROSE FULBRIGHT US LLP (57) ABSTRACT

A method for training a neural network for determining a task output with respect to a given task. The method includes: providing unlabeled and/or labelled encoder training records of measurement data; training the encoder network to map encoder training records to representations towards the goal that these representations, and/or or one or more work products derived from the representations, fulfil a self-consistency condition or correspond to ground truth; providing task training records that are labelled with ground truth; and training the association network and the task head networks towards the goal that, when a task training record is mapped to a representation using the encoder network, and the representation is mapped to a task output by the combination of the association network and the task head networks, the so-obtained task output corresponds to the ground truth with which the training record is labelled, as measured by a task loss function.

18 Claims, 2 Drawing Sheets

(51) Int. Cl.
*G06V 10/54* (2022.01)
*G06V 10/56* (2022.01)
*G06V 10/60* (2022.01)
*G06V 20/56* (2022.01)
*G06V 20/58* (2022.01)

(52) U.S. Cl.
CPC ............ *G06V 10/60* (2022.01); *G06V 20/582* (2022.01); *G06V 20/588* (2022.01); *G06V 2201/07* (2022.01)

(56) References Cited

U.S. PATENT DOCUMENTS

| | | | | |
|---|---|---|---|---|
| 2023/0351739 | A1* | 11/2023 | Lee | G01S 13/931 |
| 2024/0078792 | A1* | 3/2024 | Cheng | G06V 10/766 |
| 2024/0161497 | A1* | 5/2024 | Luengo Muntion | G06N 3/08 |
| 2024/0303984 | A1* | 9/2024 | Sanchez-Matilla | G06V 10/774 |
| 2024/0357142 | A1* | 10/2024 | Kalva | H04N 19/70 |

OTHER PUBLICATIONS

Ghiasi, Golnaz, et al. "Multi-task self-training for learning general representations." Proceedings of the IEEE/CVF International Conference on Computer Vision. 2021. (Year: 2021).*

Du et al., "Fairness via Representation Neutralization," 35th Conference on Neural Information Processing Systems (NEURIPS 2021), 2021, pp. 1-17.

Du, et al.: "Towards Interpreting and Mitigating Shortcut Learning Behavior of NLU Models," arXiv:2103.06922v3, (2021), pp. 1-15.

* cited by examiner

TRAINING NEURAL NETWORKS WITH A LESSER REQUIREMENT FOR LABELLED TRAINING DATA

CROSS REFERENCE

The present application claims the benefit under 35 U.S.C. § 119 of European Patent Application No. EP 22 17 2172.3 filed on May 6, 2022, which is expressly incorporated herein by reference in its entirety.

FIELD

The present invention relates to the training of neural networks for performing a given task, such as analyzing images of traffic situations for the purpose of at least partially automated driving.

BACKGROUND INFORMATION

Observation of the environment of a vehicle is the primary source of information that a human driver uses when steering a vehicle through traffic. Consequently, systems for the at least partially automated driving also rely on the analysis of images of the vehicle's environment. This analysis is performed using image classifiers that detect object-attribute pairs in the acquired images. For example, an object may be of a certain type (such as traffic sign, vehicle, lane) and also be given an attribute that refers to a certain property or state of the object (like a color). Such image classifiers are trained with training images that are labelled with ground truth as to their object content.

For reliable operation of the image classifier, training with a broad set of images acquired in a wide variety of situations is necessary, so that the image classifier can optimally generalize to unseen situations. When training a neural network for this task or other task, the labelling of the training data is the main driver for the total cost.

SUMMARY

The present invention provides a method for training a neural network for determining, from an input record x of measurement data, a task output y with respect to a given task.

One example of such a given task is to determine a classification of the input record x of measurement data as task output y. For example, the task output y may comprise one or more classification scores with respect to a given set of classes.

The measurement data in the input record x may be of any type. The prime example is images as measurement data. Images may be acquired with still or video cameras, thermal cameras, but also with any other suitable imaging modality. Radar or lidar data is frequently delivered in the form of point clouds. But measurement data may also, for example, comprise time series data delivered by a measurement instrument.

According to an example embodiment of the present invention, the neural network comprises an encoder network that is configured to map the input record x to a representation Z, wherein this representation Z comprises multiple independent components $z_1, \ldots, z_K$. For example, this encoder network may comprise one or more convolutional layers that apply filter kernels to the input record x (such as an image) and produce one or more feature maps.

The neural network further comprises one or more task head networks that are configured to map representation components $z_1, \ldots, z_K$ of the input record x to the task output y. For example, each of multiple task head networks may be specialized to contribute some part towards the final task output y.

These task head networks are not getting the complete representation Z with all representation components $z_1, \ldots, z_K$ as input. Rather, the neural network comprises an association network that is configured to provide, to each task head network, a linear combination $z_o$, $z_a$ of those representation components $z_1, \ldots, z_K$ of the input record x that are relevant for the task of the respective task head network. In particular, the association network may be a trainable network, so being "configured" to provide the linear combination $z_o$, $z_a$ may comprise that the association network is a trainable network that is being, and/or has been trained, for this task.

By restricting access of each task head network to particular representation components $z_1, \ldots, z_K$ of the input record x, a tendency of the neural network to learn unwanted associations during training is reduced.

For example, if the training records x comprise images that contain fire trucks with their distinctive red color, a neural network that is configured as an image classifier may associate the object type "fire truck" not only with the shape of a fire truck, but also with the color "red". In particular, because it is much easier for the image classifier to determine that the image contains much red than it is to discriminate between different shapes of vehicles, the image classifier may rely more on the color than on the shape. Such "shortcut learning" may fail to generalize to images that are not in the distribution of the training images. For example, some airport fire trucks are yellow. Because yellow is in turn the color that many school buses have, and both are vehicles with a rather large silhouette, an image classifier that has succumbed to "shortcut learning" might misclassify the yellow fire truck as a school bus.

It is the job of the association network to prevent this behavior. If it is known in advance that the shape of a vehicle is much more important and discriminative for determining the type of vehicle than the color, the association network may pass on the representation components $z_1, \ldots, z_K$ of the input image x that relate to the shape of the object to the task head network, while keeping the color of the object hidden from this task head network. During training, the task head classification network can then only work with the information it gets, and has no other choice than to learn how to discriminate between types of vehicles by shape.

This in turn allows to train the image classifier with less combinations of image properties, which in turn causes a lesser amount of training images to be required. To teach the image classifier that not all fire trucks are red, no training images that contain fire trucks of different colors are required. To overcome the "shortcut learning" just by supplying more training images that contradict this "shortcut learning" may be difficult. In the example of fire trucks, the vast majority of them are red, and an extra effort is required to deliberately procure images that show fire trucks of other colors. This effort can now be saved.

The effect is most pronounced if the representation Z is factorized into components $z_1, \ldots, z_K$ that relate to different aspects of the input image x, such that the association network may choose in a fine-grained manner which information to forward to the classification head networks for which particular task. Therefore, in a particularly advantageous embodiment, the encoder network is trained to produce a representation Z whose components $z_1, \ldots, z_K$ each contain information related to one predetermined generic basic factor of the input image x. Such generic basic factors can be compatible to several tasks. Examples for such basic factors include:

a shape of at least one object in the image x;

a color of at least one object in the image x and/or area of the image x;

a lighting condition in which the image x was acquired; and a texture pattern of at least one object in the image x.

For other data types, the components $z_1, \ldots, z_K$ may correspond to different basic factors. For example, basic factors of a generic time series of measurement data may include the slope, the presence of maxima or minima, the smoothness, or statistical properties. In another example, for an audio signal as measurement data, basic factors may include a type of the source (such as a musical instrument), the pitch of the sound, and the amplitude of the sound.

According to an example embodiment of the present invention, the training method starts with providing unlabeled and/or labelled encoder training records of measurement data. Using these training records, the encoder network is trained in a generic manner. During this training, the goal towards which the encoder is optimized is that the representations Z, and/or one or more work products derived from these representations Z, fulfil a self-consistency condition that does not rely on ground truth if the representation Z is derived from an unlabeled encoder training record; and correspond to ground truth with which the encoder training record is labelled if such ground truth is available.

In particular, the more this training can work with unlabeled encoder training records, the more expense and effort for labelling encoder training records may be saved. For example, the self-consistency condition may comprise that a reconstruction of the encoder training record obtained from the representation Z by a decoder network corresponds to the original encoder training record. That is, the combination of the encoder network and the decoder network may be trained as an autoencoder.

For the specific training towards the given task, task training records that are labelled with ground truth y* are provided. For example, the set of task training records may at least partially overlap with the set of encoder training records, with the difference that the record is now labeled with the ground truth y* (instead of a label for encoder training or no label at all). The association network, as well as the one or more task head networks, are trained towards the goal that, when a task training record is mapped to a representation Z using the encoder network, and the representation Z is mapped to a task output y by the combination of the association network and the task head networks, the so-obtained task output y corresponds to the ground truth y* with which the training record is labelled.

Both the generic training and the specific training toward the task may be performed by optimizing parameters that characterize the behavior of the encoder network, respectively of the association network and the one or more task head networks. As a feedback for this optimization, an encoder loss function, respectively a task loss function, may measure how well the respective training goal is presently achieved. This rating by the loss function may be back-propagated to the parameters that are being optimized, thereby obtaining gradients for changing these parameters.

In particular, it was found that, surprisingly, making the association network trainable and including it in the training towards the given task has a synergistic effect with the generic training of the encoder network on unlabeled encoder training records. If the association network is not trainable, its state needs to be user-provided. This means that the user has to understand the nature of the representation components $z_1, \ldots, z_K$. This understanding is a prerequisite for determining which representation components $z_1, \ldots, z_K$ are relevant for which task head network. As a consequence, the representation components $z_1, \ldots, z_K$ are limited to be of a nature that is understandable by the user in the first place. This in turn needs to be enforced by supervised training of the encoder network with ground truth. By contrast, if the association network is trainable, the representation components $z_1, \ldots, z_K$ are freed from this requirement. They can be of any nature that is appropriate for the task at hand. Therefore, the training of the encoder may be performed on unlabeled encoder training records wholly or partially.

Moreover, if the association network has been trained, rather having been pre-configured by the user, the neural network as a whole learns a better understanding of the training data, and its behavior becomes more explainable.

For example, the association network may comprise a matrix whose rows correspond to representation components and whose columns correspond to task head networks. The elements of this matrix may then provide coefficients for a linear combination (or other aggregation) of representation components $z_1, \ldots, z_K$ that is fed to each task head network.

If the input records x comprise images and the task at hand is classification, in an advantageous embodiment of the present invention, the task output y is a combination of one or more object values o and one or more attribute values a. This means that the ground truth y* comprises ground truth o* for the one or more object values o and ground truth a* for the one or more attribute values a. One of the task head networks is an object task head network that is configured to map representation components $z_1, \ldots, z_K$ of the input record x to the one or more object values o. Another task head network is an attribute task head network that is configured to map representation components $z_1, \ldots, z_K$ of the input record x to the one or more attribute values a. The object value o may, for example, designate an object type from a given set of available types. For example, when evaluating images of traffic situations, these types may include traffic signs, other vehicles, obstacles, lane markings, traffic lights or any other traffic-relevant object. As discussed above, examples of attributes a that may be classified and associated with an object value o include the color and the texture of the object. By means of the association network, color or texture information may be used for the classification of the color or texture, while a "leaking" of this color or texture information to the classification of the object type is prevented.

For determining the object value o, the association network may choose a first subset of the representation components $z_1, \ldots, z_K$ to pass on to the object task head network. For determining the attribute value a, the association network may choose a different subset of the representation components $z_1, \ldots, z_K$ to pass on to the attribute task network.

The mentioned factorization of the representation Z into multiple components $z_1, \ldots, z_K$ is already advantageous during a conventional training with labelled training images because there is no need for extra images to overcome "shortcut learning". But this factorization also allows for a new form of training that reduces the need for labelled training images even further.

In a further particularly advantageous embodiment of the present invention, the task training records comprise images of road traffic situations. On top of the actual object content, these images are dependent on so many factors that it is very difficult and expensive to acquire a set of training images with many different combinations of factors. For example, the dataset may contain active construction areas with workers on the road only at daylight times because most construction areas are not active at nighttime. But if such a construction area is active at nighttime, the image classifier should nonetheless recognize it. With the presently proposed training method, the classification may be uncoupled from whether the image was taken during daytime or nighttime because the association network can withhold the respective component $z_1, \ldots, z_K$ from the object classification head network, and/or from the attribute classification head network.

In a further particularly advantageous embodiment, for each component $z_1, \ldots, z_K$ of the representation Z, a factor head network is provided. This factor head network is configured to map the respective component $z_1, \ldots, z_K$ to a predetermined basic factor of the input record x.

Furthermore, factor training records are provided. These factor training records are labelled with ground truth values $y_1^*, \ldots, y_K^*$ with respect to the basic factors $f_1, \ldots, f_K$ represented by the components $z_1, \ldots, z_K$. For example, if the basic factor is color, the corresponding ground truth value for a factor training image is the color of an object shown in this image. As it will be discussed below, the factor training images do not need to be comprised in, or even be similar to, the original labelled training images.

By means of the encoder network and the factor head networks, the factor training records are mapped to values $y_1, \ldots, y_K$ of the basic factors $f_1, \ldots, f_K$. That is, the encoder generates representations Z with components $z_1, \ldots, z_K$, and each such component $z_1, \ldots, z_K$ is then passed on to its respective factor head network, to be mapped to the value $y_1, \ldots, y_K$ of the respective basic factor $f_1, \ldots, f_K$.

Deviations of the so-determined values $y_1, \ldots, y_K$ of the basic factors $f_1, \ldots, f_K$ from the ground truth values $y_1^*, \ldots, y_K^*$ are rated by means of an encoder loss function. Parameters that characterize the behavior of the encoder network and parameters that characterize the behavior of the factor head networks are optimized towards the goal that, when further factor training records are processed, the rating by the encoder loss function is likely to improve.

In this manner, the encoder network may be specifically trained to produce representations Z that are well factored into components $z_1, \ldots, z_K$ such that each such component $z_1, \ldots, z_K$ depends on only one basic factor. The encoder network thus learns the basic skills that it can later use to produce meaningful representations of the actual to-be-processed input records for use by the task head networks. For example, after training the encoder network, the task head networks and the association network may be trained in a conventional manner while keeping the parameters of the encoder network fixed.

The training thus becomes, in some way, analogous to the learning of how to play an instrument, such as the piano. First, a set of basic skills is learned using specifically crafted exercises that need not resemble any work of music. After the basic skills have been learned, the training may move on to real works of music. This is a lot easier than directly making the first attempts with the instrument on the real work of music and trying to learn all required skills at the same time.

In particular, in the use case of task training records with road traffic situations, the basic factors that correspond to the components $z_1, \ldots, z_K$ of the representation Z may comprise one or more of:
  a time of day;
  lighting conditions;
  a season of the year; and
  weather conditions
in which the image x is acquired.

The factor training records may be obtained from any suitable source. In particular, they do not need to bear any resemblance to the actual input records x that the neural network is being trained to process. In a particularly advantageous embodiment, the providing of factor training record therefore comprises:
  applying, to at least one given starting record, processing that impacts at least one basic factor $f_1, \ldots, f_K$, thereby producing a factor training record; and
  determining the ground truth values $y_1^*, \ldots, y_K^*$ with respect to the basic factors $f_1, \ldots, f_K$ based on the applied processing.

These factor training records are thus comparable to the exercise pieces that are played when learning how to play a musical instrument. They are "cheap" in the sense that they can be generated automatically without any human labelling, whereas the training of the task head networks requires labelled training records.

In a further particularly advantageous embodiment of the present invention, in each factor training record, each basic factor takes a particular value. The set of factor training records comprises at least one factor training record for each combination of values of the basic factors. In this manner, any unwanted correlations between factors may be broken up during the training of the encoder network. For example, in a set of factor training images, any color may appear in combination with any texture and any object shape.

Because the specific training for the task can build upon the skill in processing the basic factors $f_1, \ldots, f_K$ that the encoder network has already acquired, it can achieve good results with a lesser amount of labelled task training records.

In an advantageous embodiment of the present invention, a combined loss function is formed as a weighted sum of the encoder loss function and the task loss function. The parameters that characterize the behaviors of all networks are optimized with the goal of improving the value of this combined loss function. That is, the encoder network, the factor head networks, and the task head networks may all be trained simultaneously. The trainings may then work hand in hand in order to obtain the solution that is optimal with respect to the combined loss function. The encoder loss function and the task loss function may, for example, be cross-entropy loss functions.

In a further particularly advantageous embodiment of the present invention, combinations of one encoder network on the one hand and multiple different combinations of an association network and task networks on the other hand may be trained based on one and the same training of the encoder network with encoder training records. That is, the training based on the encoder training records may be re-used for a different application in a completely different domain of records. This saves time for the training and also facilitates regulatory approval of the neural network. For example, a regulatory seal of approval may be obtained for the encoder network once it has been trained on the factor training records. After that, if a new use case is to be handled, a new approval is only required for the newly trained task head networks.

If a training of the encoder and factor head networks is performed first, and the training of the task head networks is performed later, the learned state of the encoder network obtained during the training on the factor training records is transferred to the training on the task training records in the domain of application where the finally trained neural network is to be used. For this reason, the factor training records may be understood as "source records" in a "source domain", and the task training records may be understood as "target records" in a "target domain". But this is not to be confused with domain transfer using CycleGAN or other generative models.

If the basic factors $f_1, \ldots, f_K$ can be withheld from the task head networks, the variability among the task training records in the training dataset may be focused more on the actual semantic differences between records, such as objects in the training images. Consequently, fewer training records are needed to achieve a desired level of accuracy, such as a classification accuracy.

In a further advantageous embodiment of the present invention, the task loss function may comprise an entropy loss term. This entropy loss term may be configured such that the lower the number of representation components $z_1, \ldots, z_K$ that the association network provides to each task head network, the better the value of the entropy loss term. In this manner, each task head network may be encouraged to use information from a low number of representation components $z_1, \ldots, z_K$, and thus from a low number of basic factors $f_1, \ldots, f_K$.

In a further advantageous embodiment of the present invention, the task loss function may comprise a suppression loss term. The suppression loss term may be configured such that the lower the number of task networks that each representation component $z_1, \ldots, z_K$ is provided to be the association network, the better the value of this suppression loss term. For example, if a coefficient $A_{ij}$ assigned by the association network to a combination of a representation component $z_i = z_1, \ldots, z_K$ and one task head network $j = j_{max}$ exceeds a threshold value $\sigma$ (such as 0.33), coefficients for combinations of the same representation component $z_1, \ldots, z_K$ and other task networks may be reduced, or suppressed entirely. For example, $$\left(\sum_{j \neq j_{max}} A_{ij}\right) \cdot (sg(A_{ij_{max}}) - \tau)$$

for all rows i may be added to the suppression loss term. Herein, sg is the stop-gradient operation that prevents an updating of the $A_{ij_{max}}$ during the training. In this manner, predictions of different parts of the task output y by the different task head networks are discouraged from using same representation components $z_1, \ldots, z_K$, and thus same basic $f_1, \ldots, f_K$.

The training method described above may be wholly or partially computer-implemented, and thus embodied in software. The invention therefore also relates to a computer program, comprising machine-readable instructions that, when executed by one or more computers, cause the one or more computers to perform a method described above. In this respect, control units for vehicles and other embedded systems that may run executable program code are to be understood to be computers as well. A non-transitory storage medium, and/or a download product, may comprise the computer program. A download product is an electronic product that may be sold online and transferred over a network for immediate fulfilment. One or more computers may be equipped with said computer program, and/or with said non-transitory storage medium and/or download product.

In the following, the present invention and its preferred embodiments are illustrated using Figures without any intention to limit the scope of the present invention.

DETAILED DESCRIPTION OF EXAMPLE EMBODIMENT

Figure 1:
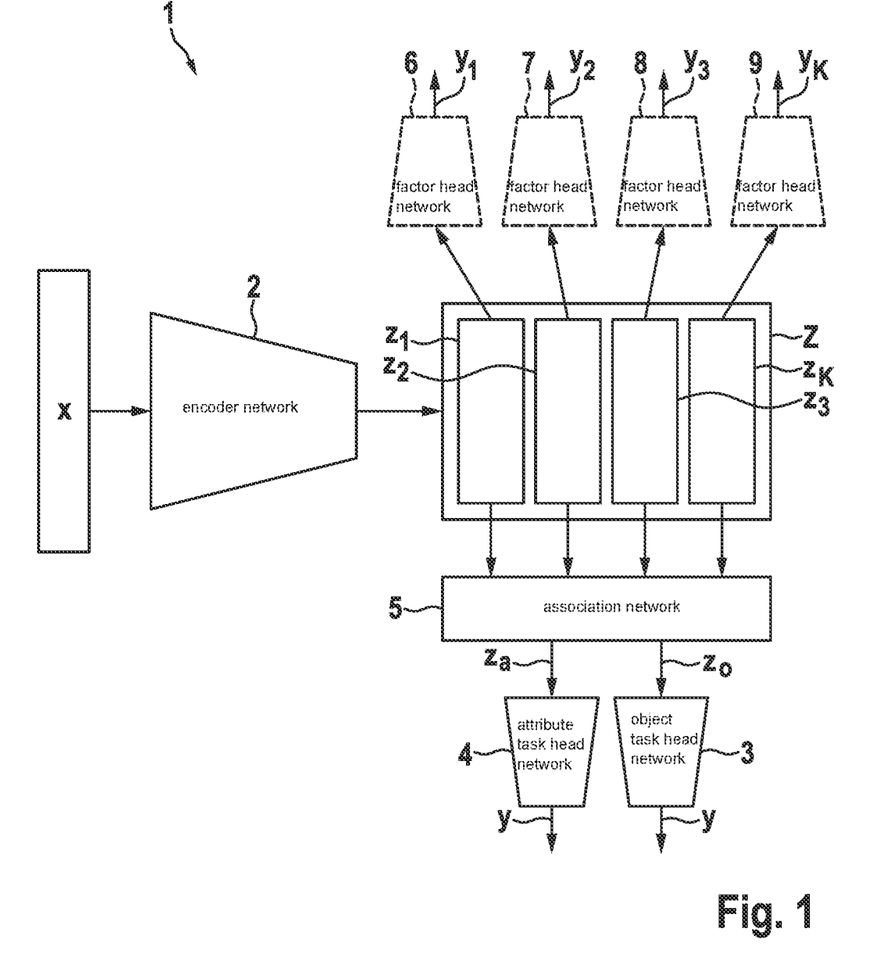
FIG. 1 shows an exemplary embodiment of the neural network 1, according to the present invention.

FIG. 1 is a schematic diagram of an exemplary embodiment of the neural network 1. The neural network 1 comprises an encoder network 2 that is configured to map an input record x to a representation Z. This representation Z comprises multiple independent components $z_1, z_2, z_3, z_K$ that each contain information related to one predetermined basic factor $f_1, f_2, f_3, f_K$ of the input record x. Values $y_1, y_2, y_3, y_K$ of the respective predetermined basic factor $f_1, f_2, f_3, f_K$ can be evaluated from the respective representation component $z_1, z_2, z_3, z_K$ by means of a respective factor head network 6-9 that is only needed during a supervised training of the encoder 2 and may be discarded once this training is complete. If the encoder 2 is trained only in an unsupervised manner, with only unlabelled encoder training records 10, no factor head networks 6-9 are necessary at all. Therefore, the factor head networks 6-9 are drawn in dashed lines.

The neural network 1 further comprises two task head networks: namely an object task head network 3 that is configured to map representation components $z_1, \ldots, z_K$ of the input image x to one or more object values o, as well as an attribute task head network 4 that is configured to map representation components $z_1, \ldots, z_K$ of the input image x to one or more attribute values a. An association network 5 provides, to each task head network 3, 4, a linear combination $z_o, z_a$ of those representation components $z_1, \ldots, z_K$ of the input image x that are relevant for the task of the respective task head network 3, 4. That is, information on which the classification head network 3, 4 should not rely is withheld from that network 3, 4. For example, to prevent that the object task head network 3 takes a "shortcut" by classifying types of vehicles in images as input records x based on their color rather than on their shape, the representation component $z_1, \ldots, z_K$ that is indicative of the color may be withheld from the object task head network 3. In another example, if the attribute task head network 4 is to determine the color of the object as attribute a, the association network 5 may withhold the representation component $z_1, \ldots, z_K$ that is indicative of the shape of the object from this attribute task head network 4. The object value o and the attribute value a form the task output y of the neural network 1.

Figure 2:
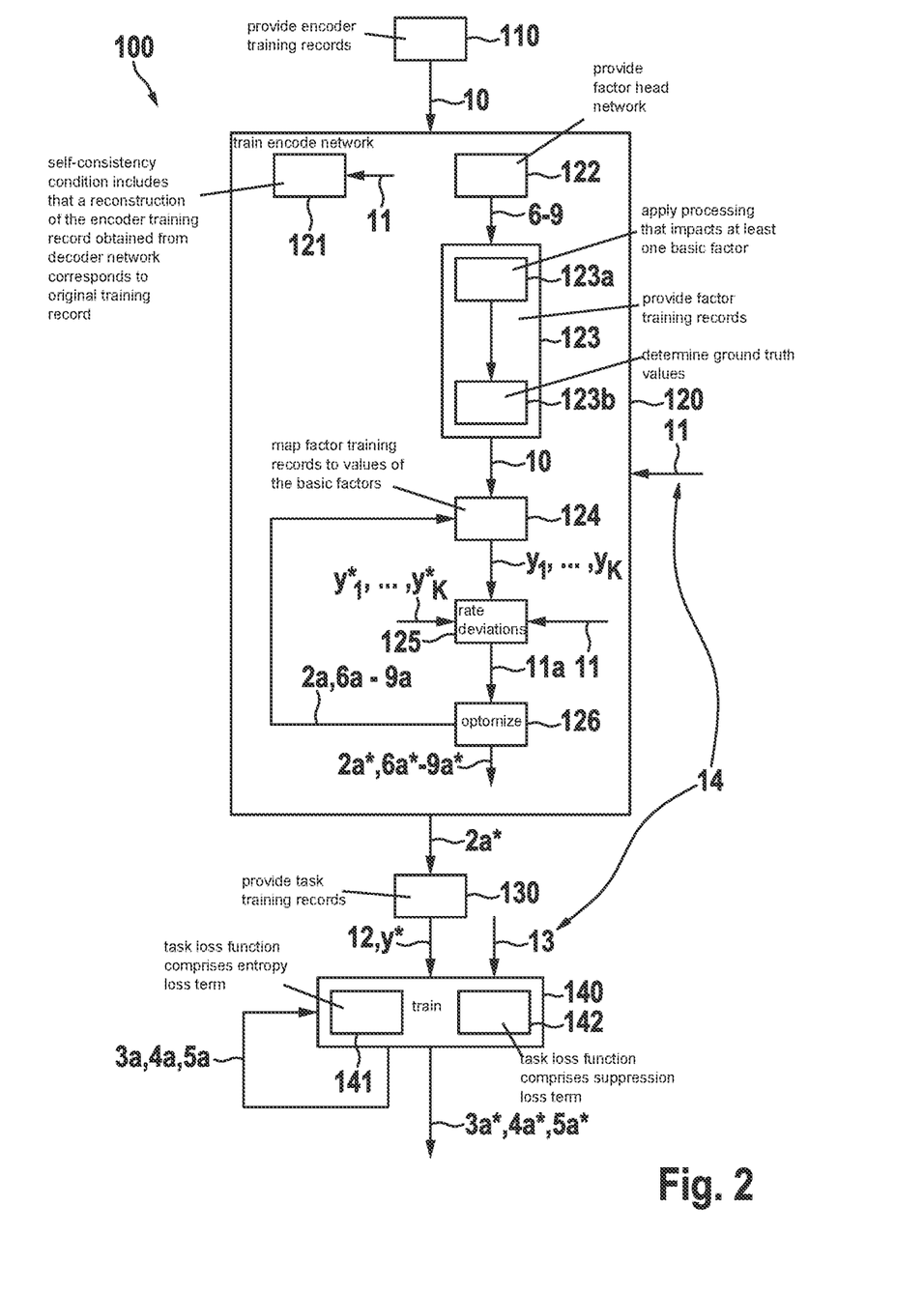
FIG. 2 shows an exemplary embodiment of the training method 100, according to the present invention.

FIG. 2 is a schematic flow chart of the method 100 for training or pre-training the neural network 1 described above.

In step 110, unlabeled and/or labelled encoder training records 10 of measurement data are provided.

In step 120, the encoder network 2 is trained to map encoder training records 10 to representations Z. The goal is that these representations Z, and/or or one or more work products derived from these representations Z, fulfil a self-consistency condition that does not rely on ground truth if the representation Z is derived from an unlabeled encoder training record 10; and corresponds to ground truth with which the encoder training record 10 is labelled if such ground truth is available.

This training uses an encoder loss function 11 that rates how well the goal is presently achieved, and the result is used as feedback for the training.

In step 130, task training records 12 that are labelled with ground truth y* with respect to the task of the neural network 1 are provided.

In step 140, the association network 5, as well as the one or more task head networks 3, 4, are trained in a task-specific manner. The goal of this training is that, when a task training record 12 is mapped to a representation Z using the encoder network 2, and the representation Z is mapped to a task output y by the combination of the association network 5 and the task head networks 3, 4, the so-obtained task output y corresponds to the ground truth y* with which the training record (12) is labelled. A task loss function 13 measures how well the goal is presently achieved, and the result is used as feedback for the training. The training optimizes parameters 3a, 4a, 5a that respectively characterize the behavior of the task head networks 3, 4 and the association network 5. The finally optimized states of these parameters are labelled with the reference signs 3a*, 4a* and 5a*.

According to block 121, the self-consistency condition for the unsupervised training of the encoder network 2 may comprise that a reconstruction of the encoder training record obtained from the representation Z by a decoder network corresponds to the original encoder training record 10.

According to block 122, for each component $z_1, \ldots, z_K$ of the representation Z, a factor head network 6-9 may be provided. This factor head network 6-9 is configured to map the respective component $z_1, \ldots, z_K$ to a predetermined basic factor $f_1, \ldots, f_K$ of the input record x.

According to block 123, factor training records 10 may be provided. These factor training records 10 are labelled with ground truth values $y_1^*, \ldots, y_K^*$ with respect to the basic factors $f_1, \ldots, f_K$ represented by the components $z_1, \ldots, z_K$.

According to block 123a, processing that impacts at least one basic factor $f_1, \ldots, f_K$ may be applied to at least one given starting record. This produced a factor training record 10. According to block 123b, the ground truth values $y_1^*, \ldots, y_K^*$ with respect to the basic factors $f_1, \ldots, f_K$ may then be determined based on the applied processing.

According to block 124, the encoder network 2 and the factor head networks 6-9 may map the factor training records 10 to values $y_1, \ldots, y_K$ of the basic factors $f_1, \ldots, f_K$. Internally, this is done as follows: The encoder network 2 maps the factor training records 10 to representations Z. Each component $z_1, z_2, z_3, z_K$ of the representation Z is passed on to the respective factor head network 6-9 that then outputs the respective values $y_1, \ldots, y_K$ of the basic factors $f_1, \ldots, f_K$.

According to block 125, deviations of the so-determined values $y_1, \ldots, y_K$ of the basic factors $f_1, \ldots, f_K$ from the ground truth values $y_1^*, \ldots, y_K^*$ may then be rated by means of an encoder loss function 11.

According to block 126, parameters 2a that characterize the behavior of the encoder network 2 and parameters 6a-9a that characterize the behavior of the factor head networks 6-9 may then be optimized towards the goal that, when further factor training records 10 are processed, the rating 11a by the loss function 11 is likely to improve. The finally trained states of the parameters 2a and 6a-9a are labelled with the reference signs 2a* and 6a*-9a*.

According to block 141, the task loss function 13 may comprise an entropy loss term. This entropy loss term may then be configured such that the lower the number of representation components $z_1, \ldots, z_K$ that the association network 5 provides to each task head network 3, 4, the better the value of the entropy loss term.

According to block 142, the task loss function 13 may comprise a suppression loss term. This suppression loss term may then be configured such that the lower the number of task networks 3, 4 that each representation component $z_1, \ldots, z_K$ is provided to be the association network 5, the better the value of this suppression loss term.

A combined loss function 14 may be formed as a weighted sum of the encoder loss function 11 and the task loss function 13. The parameters 2a, 3a, 4a, 5a, 6a, 7a, 8a, 9a that characterize the behaviors of all networks 2, 3, 4, 5, 6, 7, 8, 9 may then be optimized in one end-to-end training with the goal of improving the value of this combined loss function 14.

What is claimed is:

1. A method for training a neural network for determining, from an input record of measurement data, a task output with respect to a given task, the neural network including:
   an encoder network that is configured to map the input record to a representation, wherein the representation includes multiple independent components;
   one or more task head networks that are configured to map representation components of the input record to the task output; and
   an association network configured to provide, to each task head network of the one of more task head networks, a linear combination of those of the representation components of the input record x that are relevant for the task of the respective task head network,
the method comprising the following steps:
   providing unlabeled and/or labelled encoder training records of measurement data;
   training the encoder network to map encoder training records to representations towards a goal that the representations, and/or or one or more work products derived from the representations:
      based on the representation being derived from an unlabeled encoder training record, fulfil a self-consistency condition that does not rely on ground truth, and
      based on the representation being derived from a labelled encoder training record, correspond to the ground truth with which the encoder training record is labelled;
   providing task training records that are labelled with ground truth; and
   training the association network and the one or more task head networks towards a goal that, when the task training record is mapped to a representation using the encoder network, and the representation is mapped to a task output by a combination of the association network and the task head networks, a so-obtained task output corresponds to the ground truth with which the training record is labelled, as measured by a task loss function.

2. The method of claim 1, wherein the self-consistency condition includes that a reconstruction of the encoder training record obtained from the representation by a decoder network corresponds to an original encoder training record.

3. The method of claim 1, wherein the neural network is configured to determine a classification of the input record of measurement data as task output.

4. The method of claim 1, wherein the neural network is configured to process images as the input records of measurement data.

5. The method of claim 3, wherein:
the task output is a combination of one or more object values and one or more attribute values; and
the ground truth includes ground truth for the one or more object values and ground truth for the one or more attribute values;
an object task head network of the task head networks is configured to map the representation components of the input record to the one or more object values; and
an attribute task head network of the task head networks is configured to map the representation components of the input record to the one or more attribute values.

6. The method of claim 5, wherein an attribute value of the one or more attribute values is a color or a texture of an object.

7. The method of claim 4, wherein the task training records include images of road traffic situations.

8. The method of claim 1, further comprising:
providing, for each respective component of the representation, a factor head network that is configured to map the respective component to a predetermined basic factor of the input record;
providing factor training records that are labelled with ground truth values with respect to the basic factors represented by the components as encoder training records;
mapping, by the encoder network and the factor head networks, the factor training records to values of the basic factors;
rating deviations of the values of the basic factors from the ground truth values using an encoder loss function; and
optimizing parameters that characterize a behavior of the encoder network and parameters that characterize behavior of the factor head networks towards a goal that, when further factor training records are processed, the rating by the encoder loss function is likely to improve.

9. The method of claim 7, wherein the basic factors that correspond to the components of the representation include one or more of:
a time of day;
lighting conditions;
a season of the year; and
weather conditions;
in which the image is acquired.

10. The method of claim 8, wherein the neural network is configured to process images as the input records of measurement data, and wherein the basic factors that correspond to the components of the representation comprise one or more of:
a shape of at least one object in the image;
a color or at least one object in the image and/or area of the image;
a lighting condition in which the image was acquired;
a texture pattern of at least one object in the image.

11. The method of claim 8, wherein the providing of factor training records includes:

applying, to at least one given starting record, processing that impacts at least one of the basic factors thereby producing a factor training record; and
determining the ground truth values with respect to the basic factors based on the applied processing.

12. The method of claim 8, wherein, in each factor training record, each basic factor takes a particular value, and a set of the factor training records includes at least one factor training record for each combination of values of the basic factors.

13. The method of claim 8, wherein:
a combined loss function is formed as a weighted sum of the encoder loss function and the task loss function; and
parameters that characterize the behaviors of all networks are optimized with a goal of improving a value of the combined loss function.

14. The method of claim 1, wherein combinations of one encoder network on the one hand and multiple different combinations of an association network and task head networks on the other hand are trained based on one and the same training of the encoder network with encoder training records.

15. The method of claim 1, wherein the task loss function includes an entropy loss term, and the lower a number of representation components that the association network provides to each task head network, the better a value of the entropy loss term.

16. The method of claim 1, wherein the task loss function includes a suppression loss term, and the lower a number of task networks that each representation component is provided to be the association network, the better a value of the suppression loss term.

17. A non-transitory storage medium on which is stored a computer program for training a neural network for determining, from an input record of measurement data, a task output with respect to a given task, the neural network including:
an encoder network that is configured to map the input record to a representation, wherein the representation includes multiple independent components;
one or more task head networks that are configured to map representation components of the input record to the task output; and
an association network configured to provide, to each task head network of the one of more task head networks, a linear combination of those of the representation components of the input record x that are relevant for the task of the respective task head network,
the computer program, when executed by one or more computers, causing the one or more computers to perform the following steps:
providing unlabeled and/or labelled encoder training records of measurement data;
training the encoder network to map encoder training records to representations towards a goal that the representations, and/or or one or more work products derived from the representations:
based on the representation being derived from an unlabeled encoder training record, fulfil a self-consistency condition that does not rely on ground truth, and
based on the representation being derived from a labelled encoder training record, correspond to the ground truth with which the encoder training record is labelled;
providing task training records that are labelled with ground truth; and training the association network and the one or more task head networks towards a goal that, when the task training record is mapped to a representation using the encoder network, and the representation is mapped to a task output by a combination of the association network and the task head networks, a so-obtained task output corresponds to the ground truth with which the training record is labelled, as measured by a task loss function.

18. One or more computers configured to train a neural network for determining, from an input record of measurement data, a task output with respect to a given task, the neural network including:

an encoder network that is configured to map the input record to a representation, wherein the representation includes multiple independent components;

one or more task head networks that are configured to map representation components of the input record to the task output; and an association network configured to provide, to each task head network of the one of more task head networks, a linear combination of those of the representation components of the input record x that are relevant for the task of the respective task head network, the one or more computers configured to:

provide unlabeled and/or labelled encoder training records of measurement data;

train the encoder network to map encoder training records to representations towards a goal that the representations, and/or or one or more work products derived from the representations:

based on the representation being derived from an unlabeled encoder training record, fulfil a self-consistency condition that does not rely on ground truth, and based on the representation being derived from a labelled encoder training record, correspond to the ground truth with which the encoder training record is labelled;

provide task training records that are labelled with ground truth; and train the association network and the one or more task head networks towards a goal that, when the task training record is mapped to a representation using the encoder network, and the representation is mapped to a task output by a combination of the association network and the task head networks, a so-obtained task output corresponds to the ground truth with which the training record is labelled, as measured by a task loss function.

\* \* \* \* \*